Patented Dec. 30, 1952

2,623,888

UNITED STATES PATENT OFFICE 2,623,888

UNSATURATED KETONE ACIDS AND ESTERS

Joseph Nichols, Bronx, N. Y., assignor to Interchemical Corporation, New York, N. Y., a corporation of Ohio No Drawing. Application January 4, 1951, Serial No. 204,469

6 Claims. (Cl. 260—406)

This invention relates to the preparation of 12-keto octadecenoic acids and esters thereof.

It has now been discovered that two new acids, 12-keto oleic acid and its cis-trans isomer, 12-keto elaidic acid, and esters thereof, may be prepared by the oxidation of the 12-hydroxy group to the 12-keto group of ricinoleic and ricinelaidic acids and their esters. This invention thus differs from the known disruptive processes of oxidation in which azelaic and sebacic acids have been prepared by the oxidative scission of ricinoleic acid.

The oxidation is carried out by means of chromic acid, preferably in the presence of sulfuric acid, all reactants being in solution in glacial acetic acid so that a single-phase reaction medium is provided to furnish rapid reaction.

It has been found that an excess of chromic acid over the stoichiometric amount for oxidation of the 12-hydroxy group to the 12-keto group is necessary in order to obtain optimum yields of the desired product. A 100% excess is preferred. Again, some free sulfuric acid has been found necessary in the reaction medium, in order to obtain optimum yields of the 12-keto acids. The amount used is not critical, and generally about twice to about three times as much $H_2SO_4$ as chromic acid, on a molecular basis, is present in the reaction medium. The glacial acetic acid acts as a non-oxidizable solvent medium so that a single-phase reaction medium is provided. Again, sufficient excess is used, because of its relatively high specific heat, to moderate the temperature of the reaction medium. It has been found that when about eight to about twenty milliliters of glacial acetic acid per gram of 12-keto octadecenoic acid or ester is used, the reaction may be permitted to proceed exothermically without added heat and without cooling, and that optimum yields of product are obtained. Under such conditions, the maximum temperature of the reaction medium averages about 55° C. The most surprising feature of this process is that a short reaction time suffices. Purity and high yields are at an optimum up to about three minutes. Longer reaction times result in decreased purity and lower yields.

The short reaction time is especially important and necessary in the case of the esters, for an extended reaction time in the presence of acid saponifies the esters. Again, esters of 12-keto oleic acid and 12-keto elaidic acid cannot be prepared in pure form by ordinary acid base catalyzed reaction of the acid and an alcohol, even in the cold, for both 12-keto oleic and 12-keto elaidic acid are unstable in the presence of acid or base, undergoing isomerization. For instance, attempts to prepare such esters as the methyl and ethyl esters of 12-keto oleic or 12-keto elaidic acids by esterification of the acid with methanol or ethanol in the presence of an acid catalyst gave an impure product which was a mixture of esters resulting from partial isomerization of the 9, 10-double bond to the 10, 11-position.

The invention is illustrated by the following examples.

Example 1.—12-keto elaidic acid

To 100 grams of ricinelaidic acid dissolved in 800 mls. glacial acetic acid in a 4-liter beaker was added with vigorous stirring a solution of 80 grams sodium dichromate dihydrate in 80 mls. water, 30 mls. sulfuric acid, 98.6% $H_2SO_4$, and 650 mls. glacial acetic acid.

The temperature of the reaction medium rose to 52° C., stirring was continued for 1½ minutes, then 2 liters of ice and water mixture was added, stirring was continued for 10 minutes, and the precipitate was filtered and washed with water until free of soluble chromium salts. A white powder was obtained which was dried at room temperature, and then was recrystallized from 6 liters of petroleum ether, boiling range 30°–60° C., to give 81 grams of white, crystalline product melting at 70–71° C.

Example 2.—12-keto elaidic acid

To 75 grams of ricinelaidic acid dissolved in 300 mls. glacial acetic acid was added with vigorous stirring a solution of 35 grams sodium dichromate dihydrate in 60 mls. water, 15 mls. concentrated sulfuric acid, as above, and 300 mls. glacial acetic acid.

The reaction was allowed to proceed with continued stirring for 2 minutes at a temperature of 54° C. Two liters of ice and water mixture was added, the precipitate filtered and washed with water to remove impurities, and dried at room temperature. A yield of 62 grams of white product was obtained which melted at 64°–66° C. This was dissolved in 3½ liters of petroleum ether, as above, cooled, and 56 grams of white product melting at 64–66° C. was recovered.

Example 3.—12-keto elaidic acid

To 75 grams ricinelaidic acid dissolved in 500 mls. glacial acetic acid was added with vigorous stirring a solution of 50 grams sodium dichromate dihydrate in 25 mls. concentrated sulfuric acid, 50 mls. water, and 500 mls. glacial acetic acid. 100 mls. additional glacial acetic acid was added to control the rapidly rising temperature. Stirring was continued for 1 minute at a temperature of 57° C. Two and a half liters of ice and water was added, the precipitate washed free of soluble salts and dried. A yield of 63 grams of product, 12-keto elaidic acid, was dissolved in 3½ liters of petroleum ether. From the petroleum ether filtrate, there was recovered 56 grams of white, crystalline material melting at 71–71.5° C.

*Example 4.—12-keto elaidic acid*

To 75 grams ricinelaidic acid dissolved in 600 mls. glacial acetic acid was added with vigorous stirring a solution of 50 grams sodium dichromate dihydrate, 25 mls. concentrated sulfuric acid, 60 mls. water, and 600 mls. glacial acetic acid. Stirring was continued for 3 minutes at 51° C. Two liters of ice and water was then added, the precipitate being filtered and washed, then air dried. The 64 gram yield was crystallized from 3½ liters of petroleum ether, and 55 grams of white, crystalline 12-keto elaidic acid recovered, melting at 71–71.5° C.

*Example 5.—12-keto elaidic acid*

The procedure of Example 4 was repeated, using 100 grams of ricinelaidic acid dissolved in 1 liter of glacial acetic acid and oxidized with a solution of 65 grams sodium dichromate dihydrate, 80 mls. water, 35 mls. concentrated sulfuric acid, and 600 mls. glacial acetic acid. The reaction time was decreased to 2 minutes at a temperature of 51° C., and the crude water-washed product dried overnight in a circulating air oven kept at 40° C. A yield of 84.5 grams product was obtained, which melted at 70–71.5° C. When dissolved in 6 liters of boiling petroleum ether, 30–60° C. boiling range, and cooled to 0° to —10° C., 82 grams of a white, crystalline product melting at 70.5° C. was recovered.

Further experimentation revealed that 95% ethanol is superior to diethyl ether, benzene and petroleum ether, as a recrystallizing solvent for 12-keto elaidic acid.

Purified 12-keto elaidic acid, recrystallized three times from 95% ethanol, had a capillary tube melting point of 71.57–72.5° C.; a molecular weight of 297.6 (by titration with standard base) compared with 296.4 of theory; a carbonyl number (Leithe) of 188.3 compared with 189.5 of theory; a semi-carbanzone having a capillary melting point of 94°–95° C., a molecular weight of 350 by titration with standardized base (theory 353), and a carbon-hydrogen analysis of 64.94% C, 9.99% H, compared with respective theoretical values of 64.55% C, 9.98% H.

*Example 6.—12-keto oleic acid*

To 100 grams of ricinoleic acid dissolved in 1,000 mls. glacial acetic acid in a 4-liter beaker was added with vigorous stirring a solution of 65 grams sodium dichromate dihydrate, 80 mls. water, 35 mls. concentrated sulfuric acid, 98.6% $H_2SO_4$, and 600 mls. glacial acetic acid.

The temperature rose to 55° C., and during the stirring 300 mls. additional glacial acetic acid was added. Total reaction time was 2 minutes. Two liters of ice and water mixture at —5° C. was then added to the reaction mixture, and the precipitated 12-keto oleic acid filtered off and washed free of soluble salts. After drying at room temperature, 75 grams of product was obtained. It was dissolved in 800 mls. petroleum ether, and filtered twice to remove a small amount of high melting insoluble impurity. The clear filtrate was cooled in an ice bath, the precipitate filtered off, the filtrate cooled again in a dry ice bath, and the recovered precipitate combined with that from the previous filtration. A combined yield of 69 grams of 12-keto oleic acid was obtained having a melting point of 35°–37° C. The product was further recrystallized three times from petroleum ether, and once from 80% ethanol, the melting point being raised thereby to 40°–40.5° C.

*Example 7.—12-keto oleic acid*

The procedure of Example 6 was followed, this time with a reaction time of 30 seconds at a temperature of 53° C., and no further glacial acetic acid was added for temperature control. The water-washed precipitate of crude 12-keto oleic acid was dissolved in 800 mls. warm petroleum ether, the solvent layer separated from the bottom aqueous layer, and the warm petroleum ether solution dried by filtration through a mat of anhydrous sodium sulfate. The petroleum ether solution was cooled to room temperature and a small amount of high-melting insoluble impurity filtered off. The filtrate therefrom was cooled to 0° C. and warmed to 23° C., and about 2 grams of crude 12-keto oleic acid filtered off, the melting point of which was 37° C. On cooling the filtrate to —20° C. the precipitated 12-keto oleic acid was removed by filtration. On recrystallization once more from petroleum ether, 75 grams of 12-keto oleic acid melting at 40–40.5° C. was obtained.

*Example 8.—12-keto oleic acid*

It is not necessary to use pure ricinoleic acid in preparing 12-keto oleic acid. For example the procedure of Example 7 was followed in the oxidation of 100 grams of freshly prepared castor oil acids containing approximately 85% ricinoleic acid. In this case, the temperature was 50° C. for a reaction time of 30 seconds, when the reaction was terminated with a mixture of ice and water added to the reaction medium. The water washed crude 12-keto oleic acid was taken up in 1 liter of petroleum ether, the solvent layer separated and filtered through a mat of anhydrous sodium sulfate. The filtrate was allowed to stand for 1 hour at room temperature and again filtered to remove a trace of precipitated high melting insoluble impurity. A total of 61 grams of white 12-keto oleic acid was recovered, having a melting point of 39° C. A sample of the latter was recrystallized four times, twice from methanol, once from 80% ethanol and once from petroleum ether. It then had a melting point of 40° C.

*Example 9.—Methyl 12-keto elaidate*

To 48 grams of methyl ricinelaidate dissolved in 1,000 mls. glacial acetic acid was added a solution of 32 grams sodium dichromate dihydrate, 40 mls. water, and 20 mls. concentrated sulfuric acid, with vigorous stirring. The temperature rose to 49° C. for a reaction time of 1½ minutes, and the reaction was terminated by drowning in ice and water mixture. The precipitated methyl 12-keto elaidate was filtered off, washed with water until it was colorless, and the wet precipitate dissolved in warm petroleum ether. The petroleum ether solution was washed twice with 10% aqueous potassium carbonate, then four times with water, and dried by filtration through a mat of anhydrous sodium sulfate. This filtrate was cooled to —20° C. and the crystallized methyl 12-keto elaidate filtered off. The latter was again

Example 10.—Methyl 12-keto elaidate

The procedure of Example 9 was followed to oxidize 100 grams of methyl ricinelaidate, the reaction being terminated at the end of 30 seconds at a temperature of 50° C. The precipitated crude methyl 12-keto elaidate was washed free of soluble salts, and taken up in 1 liter of petroleum ether, which solution was washed twice with 500 mls. of 10% potassium carbonate, and four times with water, then dried by pouring through a mat of anhydrous sodium sulfate. The filtrate was cooled to −30° C., the precipitate filtered off, and dried under high vacuum. A yield of 78 grams of white platelets melting at 24–25° C. was obtained. A portion of this product was recrystallized four times from methanol, and the glistening white platelets obtained melted at 25° C.

Methyl 12-keto elaidate was found to have a carbon content of 73.84% and a hydrogen content of 10.93%, compared with theoretical figures of 73.50% and 11.04%, respectively, showed no absorption peaks in the ultra-violet region of 2200–3000 A°, and a carbonyl value, Leithe, of 183, compared with the theory of 181.

Example 11.—Methyl 12-keto oleate

To 100 grams of methyl ricinoleate dissolved in 1,000 mls. glacial acetic acid was added quickly with vigorous stirring a solution of 65 grams sodium dichromate dihydrate, 80 mls. water, 35 mls. sulfuric acid, in 600 mls. glacial acetic acid. The temperature rose to 54° C. and the reaction was continued for 1 minute, when the reaction was terminated by drowning with a mixture of ice and water. The crude methyl 12-keto oleate was extracted twice with 500 ml. portions of petroleum ether, and the combined extracts washed with 500 mls. of 10% potassium carbonate, five times with water, and dried over anhydrous sodium sulfate. The petroleum ether was removed by evaporation, finally under high vacuum, to yield 81 grams of a light yellow oil. The oil was dissolved in 200 mls. petroleum ether, cooled in a dry ice bath to −40° C., rewarmed to −15° C. until most of the precipitate had redissolved, and 0.2 gram 56° M. P. material filtered off.

The procedure of cooling to −40° C., rewarming to −15° C. and filtering off trace amounts of 56° C. M. P. material was repeated four times. The filtrate was then cooled, and the precipitate removed by filtration. This precipitate was dried by redissolving in a small amount of petroleum ether solvent, drying the solution over anhydrous sodium sulfate, and removing the solvent under high vacuum. Sixty grams of a faint yellow oil, methyl 12-keto oleate, was obtained, having a freezing point of −1° C., a carbonyl number of 182 (181 theory), a refractive index at 20° C. of 1.4592, an acid number of zero and no absorption peaks in the ultraviolet region of 2200–3000 A°.

Example 12.—Methyl 12-keto oleate

Another 100 grams of methyl ricinoleate was oxidized, this time for 30 seconds, following the procedure of Example 11, and 83 grams of crude yellow oil recovered. This was dissolved in 200 mls. petroleum ether, the solution cooled to −30° C., warmed up to 15° C., and a small amount of precipitate melting at 56° C. was filtered off and washed with cold petroleum ether, which was added to the filtrate. This procedure was repeated three more times, finally filtering off a precipitate at −35° C., which was washed with cold petroleum ether. This precipitate was taken up in a small amount of petroleum ether, the solution dried over anhydrous sodium sulfate, and the solvent removed under vacuum. A yield of 58 grams of faint yellow oil was recovered, which had a freezing point of −1° C.

12-keto oleic and 12-keto elaidic acids may be isomerized to the same 12-keto-10, 11-octadecenoic acid as the following examples show.

Example 13.—12-keto-10, 11-octadecenoic acid

A solution of 25 grams 12-keto elaidic acid in 500 mls. glacial acetic acid containing 1 ml. concentrated sulfuric acid was refluxed for 15 minutes, the brown solution thereby obtained being drowned in water, and the precipitate obtained was filtered off and dried. The dried precipitate was taken up in 600 mls. warm petroleum ether, the solution filtered through anhydrous sodium sulfate, and the filtrate cooled in a Dry Ice bath. A straw colored precipitate melting at 44–46° C. in the amount of 17.5 grams was obtained, it being the 12-keto-10, 11-octadecenoic acid. The crude yield was taken up in 300 mls. petroleum ether, decolorized with charcoal, and cooled in an ice and water bath, to yield 14 grams of faintly colored precipitate melting at 45–46° C. This product was recrystallized from 150 mls. of 70% ethanol after decolorization with charcoal. A total of 13.7 grams of white platelets melting at 47–48° C. was recovered.

Example 14.—12-keto-10, 11-octadecenoic acid

A solution of 25 grams of 12-keto oleic acid in 500 mls. glacial acetic acid containing 1 ml. concentrated sulfuric acid was refluxed for 5 minutes, and the dark brown solution obtained was drowned in water, the precipitate resulting being filtered off and dried. The dried precipitate was taken up in 600 mls. hot petroleum ether, dried with anhydrous sodium sulfate, and filtered. After standing at room temperature for about an hour, 0.5 gram of product melting at 70–80° C. was filtered off. The filtrate was cooled in a Dry Ice bath, and a yield of 15.4 grams straw colored precipitate melting at 43–46° C. was recovered. It was taken up in 300 mls. petroleum ether and let stand at room temperature for one hour, and 0.2 gram precipitate melting at 70–90° C. filtered off. The filtrate therefrom was cooled in a Dry Ice bath and 13.2 grams of yellow tinged precipitate melting at 43–45° C. was recovered. This product was recrystallized from 150 mls. 70% ethanol, and 10 grams of white platelets melting at 47–48° C. was obtained. A sample of the acid isomer was recrystallized three times from 70% ethanol, and glistening white platelets melting at 50–50.5° C. was recovered. The carbon and hydrogen analysis therefor was 73.26% carbon and 10.94% hydrogen, compared with theoretical figures of 72.93% carbon and 10.88% hydrogen. The alpha, beta unsaturated 12-keto-10, 11-octadecenoic acid showed a characteristic absorption of 348 at 2220 A°

$$\left(E \frac{1\%}{1\,cm.}\right)$$

Disruptive oxidation by potassium permanganate gave sebacic acid.

Example 15.—Methyl 12-keto-10, 11-octadecenoate

A solution of 25 grams methyl 12-keto oleate in 500 mls. glacial acetic acid containing 1 ml. concentrated sulfuric acid was refluxed for 5 minutes, then the reaction medium was drowned in ice and water mixture. The drowned mixture was extracted with 500 mls. petroleum ether, the petroleum ether layer then washed with 10% potassium carbonate solution and five times with water. It was then dried with anhydrous sodium sulfate. Most of the petroleum ether was evaporated off and the remaining 150 mls. solution was cooled in a dry ice bath, there being recovered a yellow product which was liquid at room temperature. The yellow product was recrystallized three times from 150 ml. portions of petroleum ether, cooling at —30° to —40° C. and filtering in the cold. White needles were obtained which liquefied at room temperature. This material had a freezing point of 12° C. This methyl 12-keto-10, 11-octadecenoate had a carbon content of 73.76% and a hydrogen content of 11.03%, compared with theoretical figures of 73.50% carbon and 11.04% hydrogen.

The ricinelaidic and ricinoleic acid referred to in this application were prepared by the method of Kass and Radlove, J. A. C. S. 64: 2253 (1942).

I claim:

1. As new compounds, a member of the group consisting of 12-keto-9, 10-octadecenoic acids and esters thereof.
2. 12-keto oleic acid.
3. 12-keto elaidic acid.
4. In a method for the single-phase oxidation of the 12-hydroxy group to the 12-keto group of a member of the group consisting of ricinoleic acid, ricinelaidic acid, and esters thereof, the step which comprises oxidizing a member of the group indicated with excess chromic acid for a period of time of not more than three minutes, the reaction medium being a solution of the reactants in glacial acetic acid, the oxidation being conducted in the absence of externally applied heat.
5. A method for the single-phase oxidation of the 12-hydroxy group to the 12-keto group of a member of the group consisting of ricinoleic acid, ricinelaidic acid, and esters thereof, which comprises oxidizing a member of the group indicated with excess chromic acid in the presence of sulfuric acid for a period of time of not more than three minutes, the reaction medium being a solution of the reactants in glacial acetic acid, the oxidation being conducted in the absence of externally applied heat.
6. A method for the single-phase oxidation of the 12-hydroxy group to the 12-keto group of a member of the group consisting of ricinoleic acid, ricinelaidic acid, and esters thereof, which comprises oxidizing a member of the group indicated with excess chromic acid in the presence of sulfuric acid for a period of time of not more than three minutes, the reaction medium being a solution of the reactants in glacial acetic acid, the oxidation being conducted in the absence of externally applied heat thereafter terminating the reaction, and separating and recovering a member of the group consisting of 12-keto oleic acid, 12-keto elaidic acid, and esters thereof.

JOSEPH NICHOLS.

REFERENCES CITED

The following references are of record in the file of this patent:

UNITED STATES PATENTS

| Number | Name | Date |
| --- | --- | --- |
| 2,446,849 | Price | Aug. 10, 1948 |

OTHER REFERENCES

Ellis: Journal of Chem. Soc. (London), Jan. 1950, pp. 9–12.

Ellis: Chem. Soc. Jr. (London), 1950, pp. 9–12 published Jan. 31, 1950.